US011884461B2

(12) United States Patent
Yen

(10) Patent No.: US 11,884,461 B2
(45) Date of Patent: Jan. 30, 2024

(54) PACKAGING BOX

(71) Applicant: INTERNATIONAL DESIGN PACKING CO., LTD., Suzhou (CN)

(72) Inventor: Wentai Yen, Suzhou (CN)

(73) Assignee: INTERNATIONAL DESIGN PACKING CO., LTD., Jiangsu (CN)

(*) Notice: Subject to any disclaimer, the term of this patent is extended or adjusted under 35 U.S.C. 154(b) by 443 days.

(21) Appl. No.: 16/758,242

(22) PCT Filed: Jul. 11, 2018

(86) PCT No.: PCT/CN2018/095283

§ 371 (c)(1),
(2) Date: Apr. 22, 2020

(87) PCT Pub. No.: WO2019/134357

PCT Pub. Date: Jul. 11, 2019

(65) Prior Publication Data

US 2020/0262604 A1 Aug. 20, 2020

(30) Foreign Application Priority Data

Jan. 3, 2018 (CN) ......................... 201810005366.6

(51) Int. Cl.
*B65D 5/50* (2006.01)
*B65D 5/02* (2006.01)
(Continued)

(52) U.S. Cl.
CPC ......... *B65D 5/5016* (2013.01); *B65D 5/0209* (2013.01); *B65D 5/06* (2013.01);
(Continued)

(58) Field of Classification Search
CPC ...... B65D 5/5016; B65D 5/0209; B65D 5/06; B65D 5/5007; B65D 5/14; B65D 5/0245; B65D 5/12; B65D 5/48024; A47F 5/11
(Continued)

(56) References Cited

U.S. PATENT DOCUMENTS 861,290 A 7/1907 Vaughan-Parks
1,168,565 A * 1/1916 Rosenwald .............. B65D 5/12 229/122.29
(Continued)

FOREIGN PATENT DOCUMENTS

CN 2880693 Y 3/2007
CN 104648748 A 5/2015
(Continued)

OTHER PUBLICATIONS

Extended European Search Report issued in European Application No. 18897888.6, dated Sep. 24, 2021, 7 pages.
(Continued)

*Primary Examiner* — Christopher R Demeree
(74) *Attorney, Agent, or Firm* — Brown Rudnick LLP; Matthew P. York

(57) ABSTRACT

Disclosed is a packaging box which includes a box body. The packaging box includes a cavity defined in the box body and a side wall surrounding the cavity, a support frame that disposed on an inner side of the side wall, and a bottom plate that is disposed in the cavity and at an end of the support frame. The support frame is integrated with the box body, an opening is provided in the box body, and the support frame is formed by bending the side wall located at the opening toward the cavity.

18 Claims, 5 Drawing Sheets

(51) Int. Cl.

| | |
|---|---|
| ***B65D 5/06*** | (2006.01) |
| *B31B 110/20* | (2017.01) |
| *B31B 120/30* | (2017.01) |
| *B31B 120/40* | (2017.01) |
| *B31B 50/26* | (2017.01) |
| *B31B 110/30* | (2017.01) |

(52) U.S. Cl.
CPC ........... *B31B 50/26* (2017.08); *B31B 2110/20* (2017.08); *B31B 2110/30* (2017.08); *B31B 2120/302* (2017.08); *B31B 2120/40* (2017.08)

(58) Field of Classification Search
USPC ......... 229/106, 122.29, 122.31, 120.32, 104, 229/194, 120.06; 206/418
See application file for complete search history.

(56) References Cited

U.S. PATENT DOCUMENTS

| | | | | |
|---|---|---|---|---|
| 1,204,744 A | 11/1916 | Cohn | | |
| 1,597,065 A * | 8/1926 | Davis | B65D 5/12 | 229/5.5 |
| 1,665,359 A | 4/1928 | Haas | | |
| 2,692,077 A | 10/1954 | Kuhlman | | |
| 2,723,795 A * | 11/1955 | MacKenzie | B65D 5/5007 | 206/418 |
| 3,035,751 A * | 5/1962 | Brown | B65D 85/52 | 47/84 |
| 5,299,734 A * | 4/1994 | Lane | B65B 5/10 | 229/120.15 |
| 5,730,289 A * | 3/1998 | Cappels | B65D 5/5045 | 206/434 |
| 6,227,441 B1 * | 5/2001 | Sagel | B65D 5/5007 | 229/117.35 |
| 8,523,048 B1 * | 9/2013 | Spiegelman | B65D 5/48014 | 229/120.12 |
| 9,010,074 B2 * | 4/2015 | Lemke | B65D 71/00 | 53/457 |
| D853,233 S * | 7/2019 | Hessburg | D9/432 | |
| 10,556,716 B2 * | 2/2020 | Ramos | B65D 5/3607 | |
| 10,894,646 B2 * | 1/2021 | Simpkins | B65D 5/029 | |
| 11,111,051 B2 * | 9/2021 | Hessburg | B65D 5/5007 | |
| 11,111,066 B2 * | 9/2021 | Futase | B65D 5/068 | |

FOREIGN PATENT DOCUMENTS

| | | |
|---|---|---|
| CN | 108216825 A | 6/2018 |
| EP | 1123870 A1 | 8/2001 |
| EP | 1409356 A2 | 4/2004 |
| GB | 24596 | 7/1913 |
| GB | 861290 A | 2/1961 |
| GB | 2169878 A | 7/1986 |
| GB | 2373781 A | 10/2002 |

OTHER PUBLICATIONS

Office Action of prior CN application (4 pages).
International Search Report for International Application No. PCT/CN2018/095283 (4 pages).

* cited by examiner

PACKAGING BOX

CROSS-REFERENCE TO RELATED APPLICATIONS

This application is a U.S. national stage application of co-pending international patent application number PCT/CN2018/095283 filed on Jul. 11, 2018 which claims the priority of Chinese patent application No. 201810005366.6 filed Jan. 3, 2018 and entitled "Packaging Box", contents of which are hereby incorporated herein by reference in their entireties.

TECHNICAL FIELD

The present disclosure relates to the technical field of packaging, for example, relates to a packaging box.

BACKGROUND

A packaging box, as the name implies, is used to package a product. Packages boxes may be classified by material such as a paper box, an iron box, a wooden box, a cloth box, a leather box, an acrylic box, a corrugated box, and a polyvinyl chloride (PVC) box. They may also be classified by name of the product such as a moon cake box, a tea box, a wolfberry box, a candy box, an exquisite gift box, a local specialty box, a wine box, a chocolate box, a food medicine and health care product box, a food packaging box, a tea packaging box, and a stationery box.

Main functions served by the packaging box include the following aspects: ensuring the safety of the product during transportation, and improving a grade of the product. However, the packaging boxes in the related art have a complicated structure, a high manufacturing cost, and are not foldable thus not favorable for storage.

SUMMARY

The following is a overview of the subject matters that are described herein in detail. This overview is not intended to limit the scope of protection of the claims.

The present disclosure provides a packaging box, which may solve the technical problems of the complicated structure, high manufacturing cost, and being unfavorable for folding and storage of the packaging boxes in the related art.

There is provided a packaging box which includes a box body. The box body includes a cavity defined in the box body and a side wall surrounding the cavity; a support frame, disposed on an inner side of the side wall of the box body; and a bottom plate, disposed in the cavity and on an end of the support frame; where the support frame is integrated with the box body, an opening is provided in the box body, and the support frame is formed by bending the side wall located at the opening toward the cavity.

In an embodiment, the bottom plate includes a first portion and a second portion, where an edge of the first portion is fitted with the inner side of the side wall, a bottom surface of the first portion is disposed on the support frame, and the second portion is disposed on the edge of the first portion.

In an embodiment, the bottom plate is fixed on the inner side of the side wall through the second portion.

In an embodiment, the first portion and the second portion are integrally formed, and a bending line is provided between the second portion and the first portion and is bent downward along the edge of the first portion.

In an embodiment, the second portion is bent along the bending line in a direction of nearing the support frame, and a side surface of the second portion opposite to the support frame is fitted with the support frame.

In an embodiment, of all areas on the first portion, except for areas corresponding to the support frame, edges of other areas are all provided with the second portion.

In an embodiment, a side surface of the second portion facing toward the inner side of the side wall is fitted with the inner side of the side wall.

In an embodiment, the box body is polygonal, and the opening is provided on a preset set of mutually parallel edges of the box body.

In an embodiment, the box body is cylindrical, and the opening is provided in a cylindrical surface of the box body.

In an embodiment, the support frame has a side perpendicular to the edges, and includes a first connecting portion and a second connecting portion, where the first connecting portion and the second connecting portion are respectively perpendicularly connected to two adjacent side surfaces of a same edge, a connecting edge between the first connecting portion and the second connecting portion runs parallel to the edge, and the first connecting portion and the second connecting portion are vertically connected to each other.

In an embodiment, the first connecting portion and the second connecting portion are of an identical shape and an identical size.

In an embodiment, only one side surface of the second portion on the bottom plate is fixedly connected to the inner side of the side wall.

In an embodiment, the support frames are provided in a number no less than two.

In an embodiment, the box body is cuboid-shaped, a support frame is provided on each of a preset set of mutually parallel edges of the box body.

As can be seen from the above, the packaging box disclosed in the present disclosure has a simple structure and is easy to use. An integrated support frame is designed, so that the manufacturing cost is reduced, the weight that can be borne by the packaging box is increased, and so the packaging box is more firm. Furthermore, the support frame and the bottom plate are easily foldable, such that the packaging box would take up less space when it is in the folded state.

Other aspects will be understood after reading and understanding the accompanying drawings and the detailed description.

BRIEF DESCRIPTION OF DRAWINGS

In the drawings, identical or nearly identical portions that are illustrated in various figures may be represented by the same reference numeral. For the sake of clarity, not every portion is labeled in each drawing. Embodiments of each aspect of the present disclosure will now be described by way of example and with reference to drawings, in which.

Figure 1:
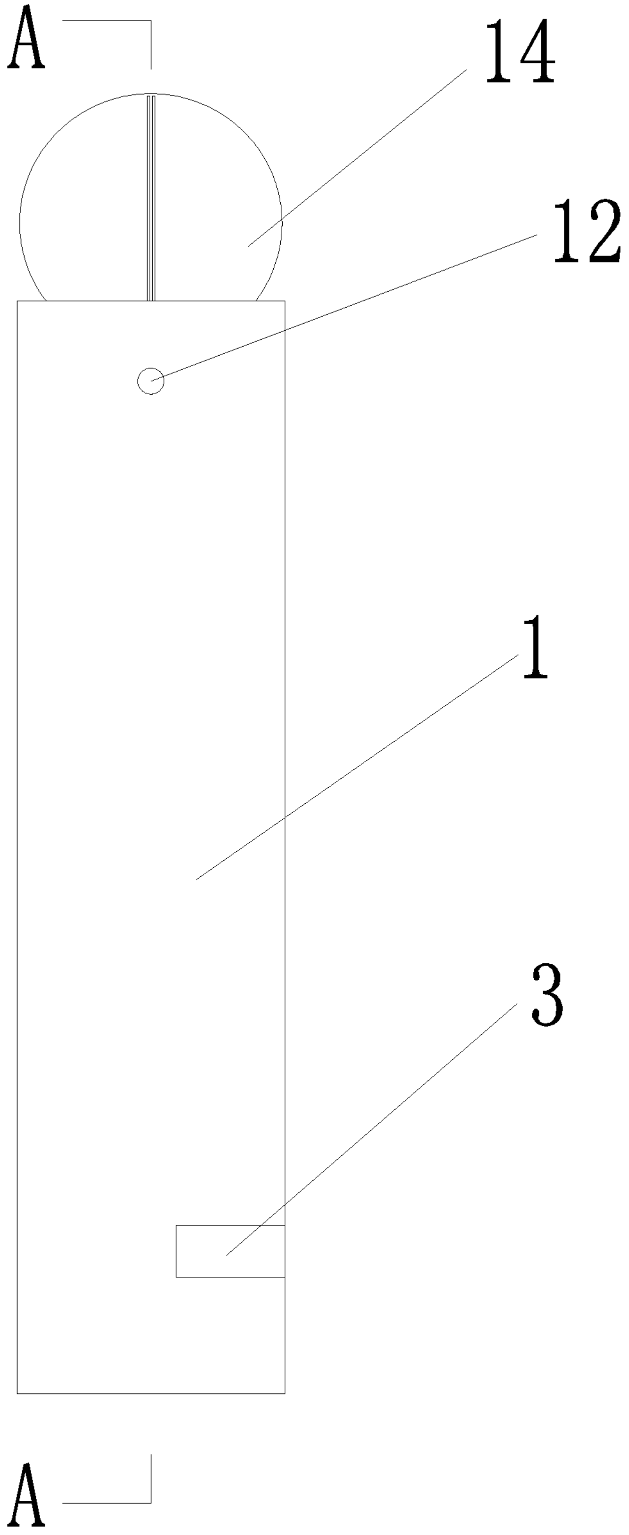
FIG. 1 is a schematic diagram of a packaging box in accordance with an embodiment.

In the drawings: Box body 1; Cavity 2; Support frame 3; Bottom plate 4; Front end surface 5; Right side surface 6;

Rear end surface 7; Left side surface 8; First connecting portion 9; Second connecting portion 10; Opening 11; Hanging hole 12; Adhesive strip 13; Box cover connecting piece 14; Rectangular hole 15; Rectangular groove 16; First portion 17; Second portion 18.

DETAILED DESCRIPTION

Figure 2:
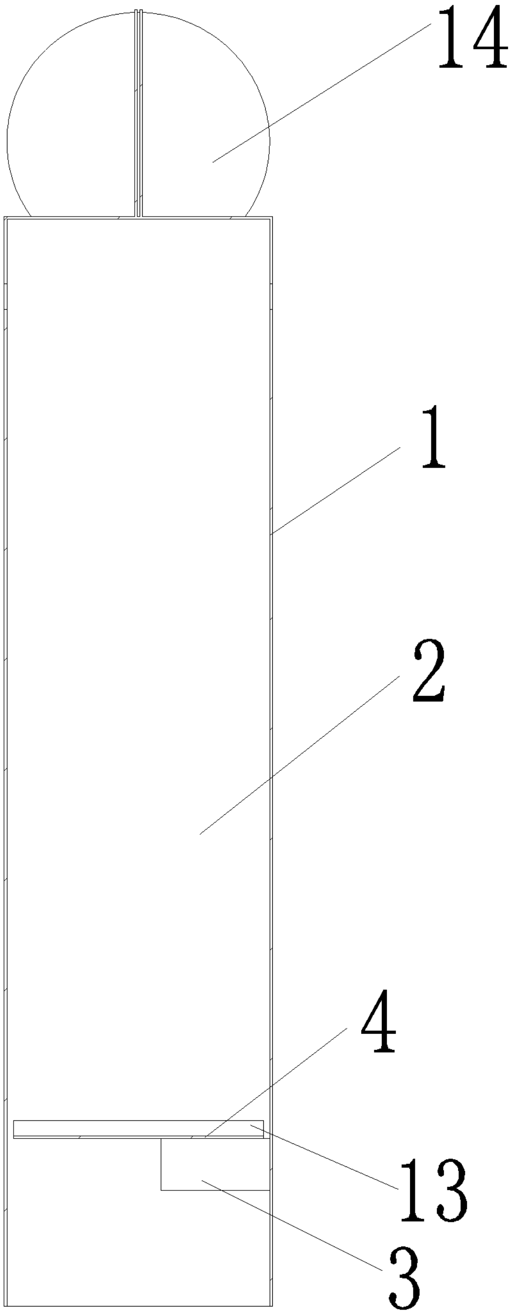
FIG. 2 is a sectional view taken along A-A' of FIG. 1.
Figure 3:
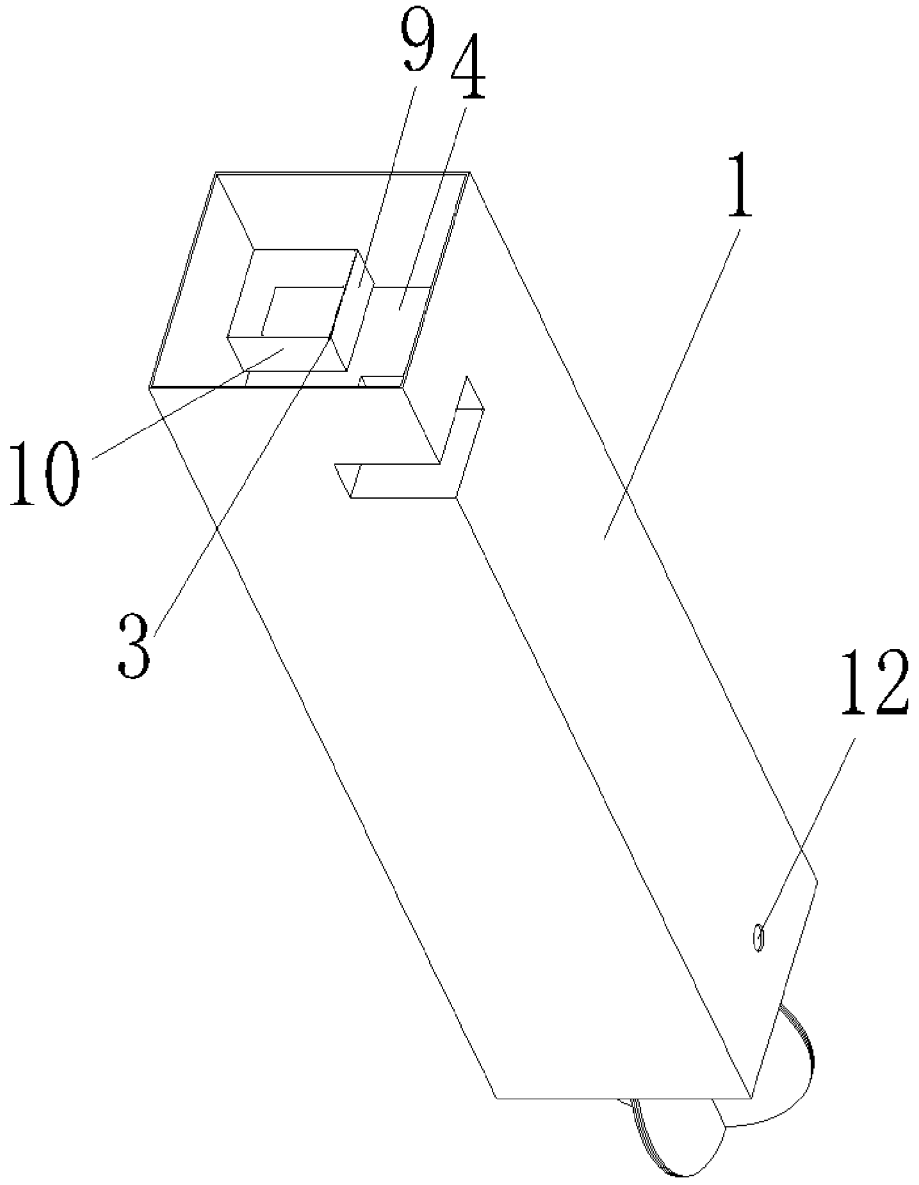
FIG. 3 is a perspective view of a packaging box in accordance with an embodiment.

As illustrated in FIGS. 1 to 3, a packaging box includes a box body 1, a cavity 2 is defined in the middle of the box body 1, and a plurality of support frames 3 are provided on an inner wall of the cavity 2 of the box body 1. A bottom plate 4 is provided on an upper end surface of the support frame 3 in the cavity 2, the support frame 3 is integrated with the box body 1, and the box body 1 is provided with an opening 11 at a position corresponding to the support frame 3, and a side wall of the box body 1 at a position of the opening 11 is bent inward through the opening 11 to form the support frame 3.

The above packaging box is an integrated structure, and the bottom plate 4 is supported by the support frame 3, so that bearing capacity of the bottom plate 4 is stronger, and the support frame 3 is a bent structure, when the packaging box is stored, the support frame 3 may be folded back in a reverse direction, so that there is no longer any support inside the box body 1, which is convenient for folding and storage together with the box body 1.

Figure 5:
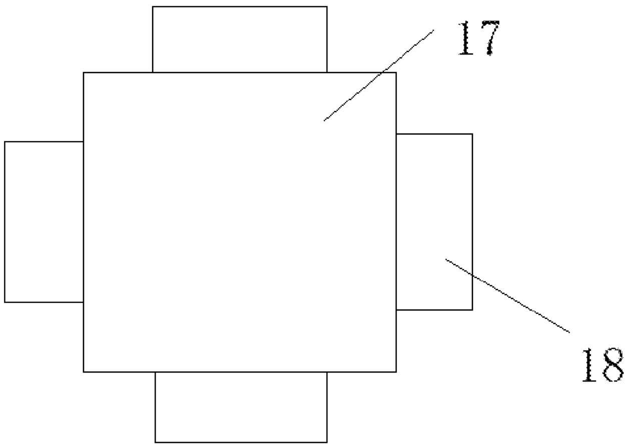
FIG. 5 is a schematic diagram of a bottom plate in accordance with an embodiment.

In some embodiment, as illustrated in FIG. 5, the bottom plate 4 includes a first portion 17 and a second portion 18, where an edge of the first portion 17 is fitted with an inner wall of the cavity 2 of the box body 1, a bottom surface of the first portion 17 is disposed on the support frame 3, and the second portion 18 is disposed on the edge of the first portion 17. In an embodiment, the inner wall refers to the inner side of the side wall of the box body 1.

In some embodiments, the bottom plate 4 is fixed on the inner wall of the cavity 2 of the box body 1 via the second portion 18. The bottom plate 4 is fixed on the box body 1 so that the packaging box is not easily lost during production, transportation, and use. Fixing means include direct adhesive methods such as glue, adhesive strips 13, hot melt adhesive, or mechanical connection methods such as snaps.

In some embodiment, the first portion 17 and the second portion 18 are an integrated structure, and a bending line is provided between the second portion 18 and the first portion 17 and is bent along the edge of the first portion 17. The bottom plate 4 of integrated structure is provided in a bendable form, which makes it easy to flatten when the packaging box is stored, and will not affect overall flatness after bending.

A bending direction of the second portion 18 may be upward or downward, when the bending direction is upward, the second portion 18 is not in direct contact with the support frame 3 below the first portion 17, and a position of the second portion 18 will not affect the assembly of the bottom plate 4.

In some embodiment, the second portion 18 is bent downward along the bending line, and in order to avoid the support frame 3, for positions on the first portion 17, except for a position corresponding to the support frame 3, the second portion 18 is provided at edges of other positions.

In some embodiments, the second portion 18 is bent downward along the bending line, and in the second portion 18, a side surface of the second portion 18 facing toward the support frame 3 is fitted with the support frame 3. In this way, the second portion 18 may not only connect the bottom plate 4 and the box body 1, but also play a certain supporting role on the support frame 3, so that the support frame 3 is not easily deformed.

In some embodiments, for the second portion 18, the side surface of the second portion 18 facing toward the inner wall of the cavity 2 of the box body 1 is fitted with the inner wall of the cavity 2 of the box body 1. Therefore, adhesive strips 13 or applying glue, hot-melt adhesive, etc. may be pasted on an opposite side surface of the second portion 18, making the second portion 18 fixedly connected to the inner wall of the cavity 2 of the box body 1.

The shape of the above-mentioned packaging box is variable, and the packaging box generally has a polygonal shape and a cylindrical shape. In some embodiments, when the box body 1 is polygonal, the opening 11 is provided on a vertical edge of the box body 1. The box body 1 is cylindrical, and the opening 11 is provided on a cylindrical surface of the packaging box. The vertical edges are a preset set of mutually parallel edges of the box body.

For a polygonal box body 1, in some embodiment, the support frame 3 has a side perpendicular to the edge, and includes a first connecting portion 9 and a second connecting portion 10, where the first connecting portion 9 and the second connecting portion 10 are respectively perpendicularly connected to two adjacent side surfaces of a same vertical edge, a connecting edge between the first connecting portion 9 and the second connecting portion 10 is parallel to the corresponding vertical edge, and the first connecting portion 9 and the second connecting portion 10 are vertically connected to each other. The first connecting portion 9 and the second connecting portion 10 are vertically arranged, so that the support frame 3 is not easily deformed and has a strong supporting strength.

In an embodiment, the first connecting portion 9 and the second connecting portion 10 are of an identical shape and an identical size. In this way, the support frame 3 is more uniformly stressed, which is beneficial to stability.

In an embodiment, in order to facilitate storage, only one side surface of the second portion 18 on the bottom plate 4 is fixedly connected to the inner wall of the cavity 2 of the box body 1. This not only enables a solid connection between the bottom plate 4 and the inner wall of the cavity 2 of the box body 1, but also does not affect the folding and storage of the entire packaging box. During the folding and storage, a part of the bottom plate 4 that is not connected to the inner wall of the cavity 2 of the box body 1 is folded to be fitted with the side wall of the box body 1.

In some embodiments, in order to effectively and uniformly perform the supporting role, the support frames 3 generally comes in the number of two or more, and in an embodiment, the two or more support frames are evenly distributed under the bottom plate 4.

Figure 4:
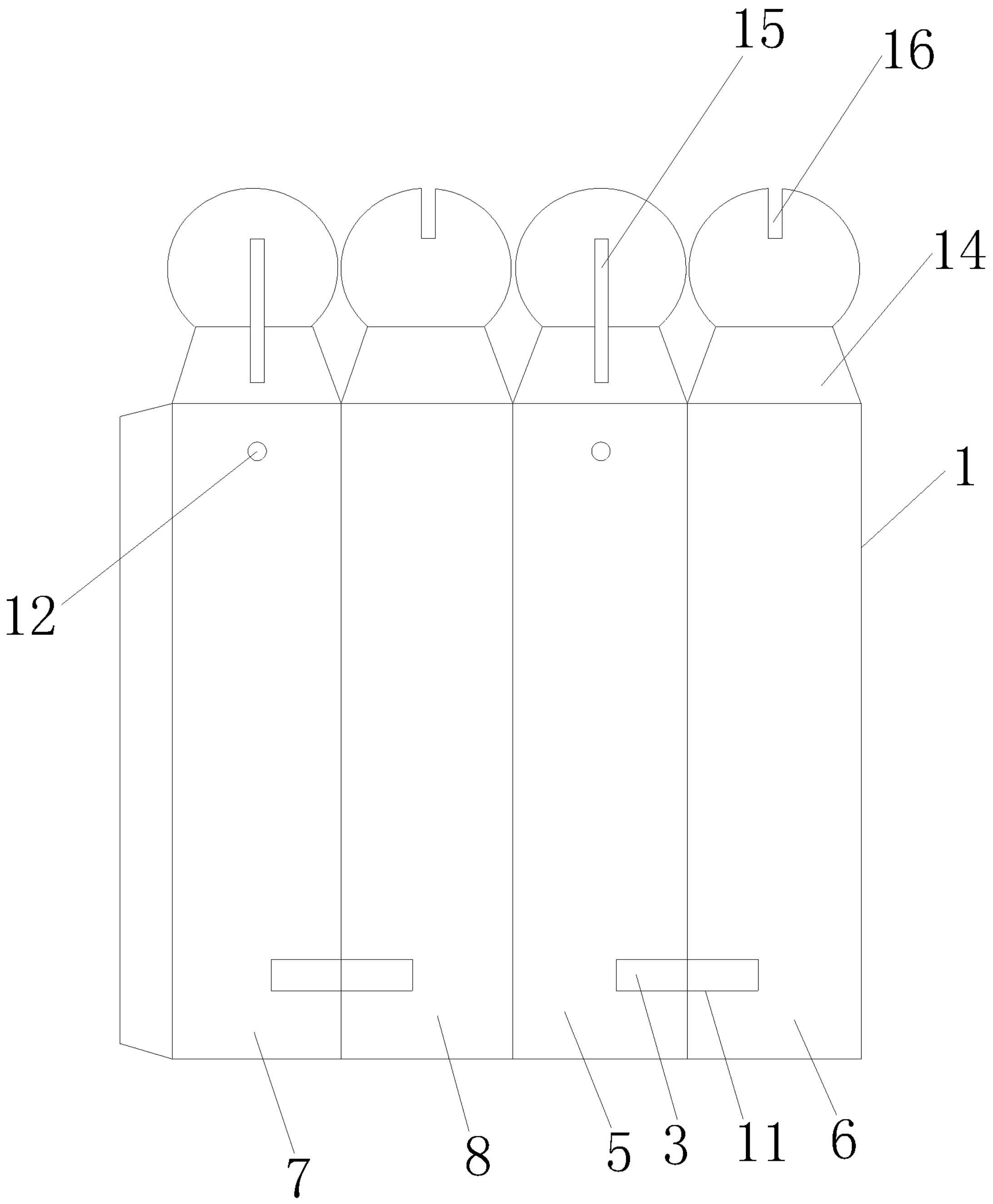
FIG. 4 is a plan view of a packaging box in accordance an embodiment.

In an embodiment, the packaging box is cuboid-shaped, as illustrated in FIGS. 3 and 4, the box body 1 is formed of a rectangular parallelepiped shape formed by connecting a rear end surface 7, a left side surface 8, a front end surface 5, and a right side surface 6 of a quarter of paper in order, and the middle of the rectangular parallelepiped shape forms a square cavity 2. In an embodiment, the support frame 3 is provided on each vertical edge, so that a supporting force for the bottom plate 4 is uniform, making the packaging box difficult to deform.

A solution in which two support frames 3 are provided is illustrated in FIGS. 1 to 4. The two support frames 3 are provided on the inner wall of the cavity 2 in a lower part of the box body 1, the box body 1 corresponding to the support frame 3 is provided with the opening located on two opposite sets of vertical edge, and the bottom plate 4 is provided on the upper end surfaces of the two support frames 3 in the cavity 2. In an embodiment, the support frame 3 includes a first support frame and a second support frame, where each of two ends of the first support frame is vertically disposed on the front end surface 5 and the right side surface 6 of the box body 1, and each of two ends of the second support frame is vertically disposed on the rear end surface 7 and the left side surface 8. The first support frame and the second support frame each include the first connecting portion 9 and the second connecting portion 10, where the first connecting portion 9 and the second connecting portion 10 are perpendicular to each other, and are of a same length. The support frame 3 is integrated with the box body 1, and the support frame 3 is formed by inwardly folding the opening 11 of the box body 1.

In an embodiment, the box body 1 is provided with a hanging hole 12 arranged on an upper portion (the upper part refers to an upper portion of the box body 1 in FIG. 4) of the box body 1, and a number of the hanging holes 12 is two or four. A solution of two hanging holes 12 is shown in FIG. 4, where one of the two hanging holes 12 is located in the front end surface 5 and the other of the two hanging holes 12 is located in the rear end surface 7. A hanging rope is provided between the two hanging holes 12, two ends of the hanging rope are respectively arranged in the two hanging holes 12, and the packaging box may be lifted via cooperation of the hanging hole 12 and the hanging rope.

In an embodiment, a box cover connecting piece 14 is provided on the upper end of the front end surface 5, the rear end surface 7, the left side surface 8, and the right side surface 6 of the box body 1, an upper portion of the box cover connecting piece 14 is arc-shaped, while a lower portion of the box cover connecting piece 14 is trapezoidal, and a crease is provided between the upper portion and the lower portion of the box cover connecting piece 14. A rectangular hole 15 is longitudinally provided in the middle of the box cover connecting piece 14 at both the front end surface 5 and the rear end surface 7 of the box body 1, and passes through the upper portion and the lower portion of the box cover connecting piece 14. The upper portions of the box cover connecting piece 14 at the upper end of the left side surface 8 and the right side surface 6 of the box body 1 are both longitudinally provided with a rectangular groove 16. The box cover connecting pieces 14 at the upper ends of the left side surface 8 and the right side surface 6 of the box body 1 both pass through the rectangular holes 15 on the box cover connecting pieces 14 at the front end surface 5 and the rear end surface 7 of the box body 1, and the rectangular grooves 16 of the box cover connecting piece 14 on the upper portion of the left side surface 8 and the right side surface 6 of the box body 1 are disposed in the rectangular holes 15 of the box cover connecting piece 14 on the front end surface 5 and the rear end surface 7, and the box cover connecting piece 14 is integrated with the box body 1.

When in use, the box body 1 is folded into the rectangular parallelepiped shape via a fold line, the opening 11 of the box body 1 is folded internally to form the support frame 3, the bottom plate 4 is placed on the support frame 3, items to be packaged are placed on the bottom plate 4, and then attach the upper portion of the box cover connecting piece 14 at the upper end of the left side surface 8 and the right side surface 6 of the box body 1 together, and make the upper portion perpendicular to the box body 1 via the creasing. The box cover connecting pieces 14 at the upper ends of the left side surface 8 and the right side surface 6 both pass through the rectangular holes 15 on the box cover connecting pieces 14 of the front end surface 5 and the rear end surface 7 of the box body 1. The rectangular groove 16 is arranged in the rectangular hole 15 and is vertically inserted into the rectangular hole 15. The upper portion of the rectangular hole 15 is connected together via the rectangular groove 16, and the box cover connecting piece 14 is perpendicular to the box body 1 via the crease.

As can be seen from the above, the packaging box solution provided by the embodiment of the present disclosure has a simple structure and is easy to use. An integrated support frame 3 is designed, so that the manufacturing cost is reduced, and the weight that can be borne by the bottom of the packaging box is increased, making the packaging box more secure. Furthermore, the packaging box has a structure that is easy to fold and so the space required for the storage of the packaging box is reduced.

What is claimed is:

1. A packaging box, comprising:

a box body, comprising a cavity defined in the box body and a side wall surrounding the cavity;

a support frame, disposed on an inner side of the side wall; and a bottom plate, disposed in the cavity and at an end of the support frame;

wherein the support frame is integrated with the box body, an opening is provided in the box body, and the support frame is formed by bending the side wall located at the opening toward the cavity;

wherein the bottom plate comprises a first portion and a second portion;

wherein an edge of the first portion is fitted with the inner side of the side wall, a bottom surface of the first portion is disposed on the support frame, and the second portion is disposed on the edge of the first portion;

wherein only one side of the second portion is fixedly connected to the inner side of the side wall.

2. The packaging box according to claim 1, wherein the bottom plate is fixed on the inner side of the side wall through the second portion.

3. The packaging box according to claim 2, wherein the first portion and the second portion are integrally formed, and a bending line is provided between the second portion and the first portion and is bent along the edge of the first portion.

4. The packaging box according to claim 3, wherein the second portion is bent along the bending line in a direction of nearing the support frame, and a side of the second portion opposite to the support frame is fitted with the support frame.

5. The packaging box according to claim 4, wherein of all areas on the first portion, except for areas corresponding to the support frame, edges of other areas are all provided with the second portion.

6. The packaging box according to claim 4, wherein a side surface of the second portion facing toward the inner side of the side wall is fitted with the inner side of the side wall.

7. The packaging box according to claim 4, wherein the box body is cylindrical, and the opening is provided in a cylindrical surface of the box body.

8. The packaging box according to claim 3, wherein the box body is polygonal, and the opening is provided on a preset set of mutually parallel edges of the box body.

9. The packaging box according to claim 3, wherein the box body is cylindrical, and the opening is provided in a cylindrical surface of the box body.

10. The packaging box according to claim 2, wherein the box body is polygonal, and the opening is provided on a preset set of mutually parallel edges of the box body.

11. The packaging box according to claim 2, wherein the box body is cylindrical, and the opening is provided in a cylindrical surface of the box body.

12. The packaging box according to claim 1, wherein the box body is polygonal, and the opening is provided on a preset set of mutually parallel edges of the box body.

13. The packaging box according to claim 12, wherein the support frame comprises a side perpendicular to the edges, and comprises a first connecting portion and a second connecting portion, wherein the first connecting portion and the second connecting portion are respectively perpendicularly connected to two adjacent side surfaces of a same edge, a connecting edge between the first connecting portion and the second connecting portion runs parallel to the edge, and the first connecting portion and the second connecting portion are vertically connected to each other.

14. The packaging box according to claim 13, wherein the first connecting portion and the second connecting portion are of an identical shape and an identical size.

15. The packaging box according to claim 12, wherein the box body is cuboid-shaped, and a support frame is provided on each of a preset set of mutually parallel edges of the box body.

16. The packaging box according to claim 1, wherein the box body is cylindrical, and the opening is provided in a cylindrical surface of the box body.

17. The packaging box according to claim 16, wherein the support frames are provided in a number no less than two.

18. The packaging box according to claim 1, wherein the box body is polygonal, and the opening is provided on a preset set of mutually parallel edges of the box body.

* * * * *